9054X
T. Goodrum.
Shaping Neck Stocks.
Patented Aug. 27, 1835
Nº
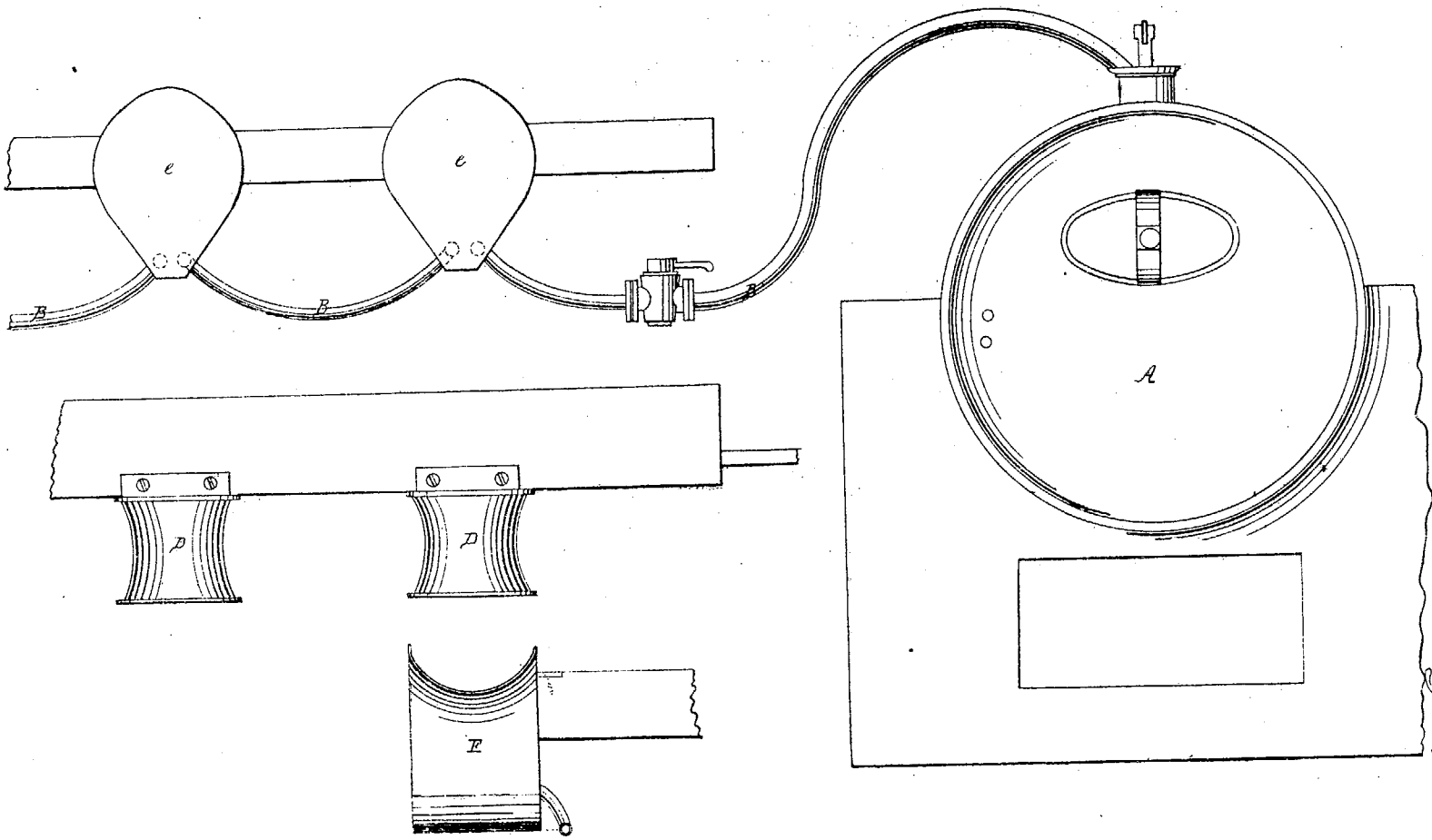

Aug. 27 1835 105

Thomas Goodwin 9054X

Letters Patent.

The Schedule referred to in these Letters Patent and making part of the same, containing a description in the words of the said Thomas Goodwin himself of his improvement in the art of Manufacturing Neck Stocks.

This applicant uses Whale bone in the making of Neck Stocks and of the cloth or body thereof instead of hair or bristles as now and formally used. The Whalebone is to be prepared by being divided into small strips or slivers about the size of hogs bristles or larger or smaller as may be wished and then woven or insert-ed into the cotton or other warp of other materials thus making a kind of cloth of any convenient size, composed of the whale bone strips as filling in part and of cotton or linen or silk thread or any other material for the alternate threads of the filling and for the warp. This cloth is then to be shaped into stocks. To effect this the cloth is to be placed on a frame of the shape or nearly the shape of a persons neck and to be fitted thereto by means of steaming or any other heat. The advantage of this material (whalebone) over other materials consists in its cheapness and in its preserving in a superior degree its elasticity, and nothing as liable as other materials to be broken down; and in its uniformity of size, being the same size throughout, Whereas bristles and hair are tapering, and larger at one end than at the other, after the stocks are framed they may be covered if desired with silk or any other material.

The principle of this improvement consists in the manu-facture of Neck Stocks with strips or pieces of whalebone of any convenient size and shape instead of bristles or hair, substantially in the method above described.

Dated

106.

9054X

Dated City of New York 28th July 1835.

Witnesses
J W Fowler
A Williams

Thos. Goodrum

[348 Words (Drawing)